(12) United States Patent
Sakai et al.

(10) Patent No.: US 11,333,832 B2
(45) Date of Patent: May 17, 2022

(54) OPTICAL FUNCTIONAL DEVICE

(71) Applicant: SUMITOMO OSAKA CEMENT CO., LTD., Tokyo (JP)

(72) Inventors: Takeshi Sakai, Tokyo (JP); Norikazu Miyazaki, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 17/174,611

(22) Filed: Feb. 12, 2021

(65) Prior Publication Data

US 2021/0294040 A1 Sep. 23, 2021

(30) Foreign Application Priority Data

Mar. 23, 2020 (JP) .............................. JP2020-051074

(51) Int. Cl.
*G02B 6/30* (2006.01)
*G02B 6/34* (2006.01)
*G02B 6/42* (2006.01)
*G02F 1/035* (2006.01)

(52) U.S. Cl.
CPC ................. *G02B 6/30* (2013.01); *G02B 6/34* (2013.01); *G02B 6/4246* (2013.01); *G02F 1/0356* (2013.01)

(58) Field of Classification Search
CPC ........ G02B 6/264; G02B 6/2773; G02B 6/30; G02B 6/32; G02B 6/34; G02B 6/325; G02B 6/4256; G02B 2006/121; G02F 1/0356

USPC ......................................... 385/36, 43, 49, 92
See application file for complete search history.

(56) References Cited

U.S. PATENT DOCUMENTS

2015/0261017 A1* 9/2015 Doi ...................... H04B 10/501
398/201

FOREIGN PATENT DOCUMENTS

JP 2014-167546 9/2014
JP 2015-172630 10/2015

* cited by examiner

*Primary Examiner* — Michael P Mooney
(74) *Attorney, Agent, or Firm* — Rankin, Hill & Clark LLP

(57) ABSTRACT

An optical functional device includes a package case accommodating an optical functional element, an input optical fiber, and an output optical fiber. The optical functional device includes a first reflecting surface that reflects input light output from the input optical fiber to an optical path of output light, a second reflecting surface that reflects the input light to the optical functional element, and a third reflecting surface that reflects the output light in a direction in which the output light becomes further away from an optical axis of the input optical fiber. An optical axis of a leaked light beam transmitted through the second reflecting surface after being reflected by the first reflecting surface or an extension line of the optical axis in an optical propagation medium does not include a portion that is aligned with an optical axis of the output light reflected by the third reflecting surface.

6 Claims, 10 Drawing Sheets

DETAILS OF PORTION A

IX-IX CROSS SECTION

OPTICAL FUNCTIONAL DEVICE

CROSS-REFERENCE TO RELATED APPLICATIONS

This application claims the benefit of Japanese Patent Application No. 2020-051074 filed Mar. 23, 2020, the disclosure of which is herein incorporated by reference in its entire.

BACKGROUND OF THE INVENTION

Field of the Invention

The present invention relates to an optical functional device that has an optical function, such as optical modulation, and more particularly, to an optical functional device in which both an input optical fiber and an output optical fiber are disposed on one surface of a package case.

Description of Related Art

In high-frequency/large-capacity optical fiber communication systems, optical transmission devices, into which waveguide-type optical elements (hereinafter, referred to as optical modulation elements) performing optical modulation are incorporated, are generally used. Among them, an optical modulation element in which a substrate is made of LiNbO$_3$ (hereinafter, also referred to as LN) having an electro-optic effect is widely used in the high-frequency/large-capacity optical fiber communication system since it has a smaller optical loss and can achieve more broadband optical modulation characteristics than a modulation element using a semiconductor-based material, such as indium phosphide (InP), silicon (Si), or gallium arsenide (GaAs).

In a modulation method in the optical fiber communication system, multi-level modulation, such as Quadrature Phase Shift Keying (QPSK) or Dual Polarization-Quadrature Phase Shift Keying (DP-QPSK), or a transmission format in which polarization multiplexing is incorporated into multi-level modulation is mainly used in response to the recent trend of increasing transmission capacity.

The acceleration of the spread of Internet services in recent years has led to a further increase in communication traffic, and studies on high-frequency and large-capacity optical communication systems have been continuously conducted. In an optical communication system that exceeds 400 Gbps, the symbol rate of a modulation signal reaches 64 Gbaud, 96 Gbaud, or higher. Therefore, there is a problem that the modulation signal deteriorates greatly due to the connection between a DSP, a modulator driver, and a modulator through a high-frequency interface. On the other hand, the demand for reducing the size of the device remains unchanged. In addition to reducing the size of the optical modulation element, for example, efforts are underway to accommodate an electronic circuit and an optical modulation element in one package case and to integrate them into an optical modulation device.

For example, an optical modulation device has been proposed in which an optical modulation element and a high-frequency driver amplifier that drives the optical modulation element are integrated and accommodated in one package case and optical input and output ports are disposed in parallel on one surface of the package case. With this configuration, the optical modulation device has a small size and a high degree of integration while reducing the deterioration of a modulation signal due to high-frequency connection.

As this optical modulation device, in the related art, an optical modulation module is known in which an input optical fiber that introduces input light into a package case and an output optical fiber that guides output light from an optical modulation element accommodated in the package case to the outside of the package case are disposed in parallel at two positions on one surface of the package case through a set of separate mechanical members (holding members) (see Japanese Laid-open Patent Publication No. 2014-167546).

In the optical modulation module disclosed in Japanese Laid-open Patent Publication No. 2014-167546, the input optical fiber and the output optical fiber that are disposed on one surface of the package case accommodating the optical modulation element and the optical modulation element are optically coupled by space optical systems through lenses. In this optical modulation module, the disposition of components in the package case is devised to efficiently secure the path of light propagated through a space in the package case. Therefore, the size of the package case accommodating the optical modulation element and the electronic circuit is reduced.

However, in this optical modulation module, the input optical fiber and the output optical fiber are disposed on one surface of the package case, and the optical modulation element used in the package case has an optical input port and an optical output port provided in two different end surfaces of the substrate which forms the optical modulation element and has a rectangular shape in a plan view. Therefore, for example, the length of an input optical path from the input optical fiber to the optical input port is greater than the length of an output optical path from the optical output port to the output optical fiber. Therefore, it may be rather difficult to reduce optical coupling loss from the input optical fiber to the optical input port. In addition, in a long optical path portion, there is a problem that the propagation axis of light is inclined or deviated from the optimum position due to the distortion of the package case or the like caused by temperature fluctuation or the like and loss fluctuation is likely to occur.

As a measure to reduce the coupling loss, a configuration is considered in which both an optical input port and an optical output port of an optical modulation element are provided on one end surface of a substrate forming the optical modulation element. However, in this case, a space propagation path of input light from an input optical fiber and a space propagation path of output light to an output optical fiber are mixed in a narrow space between one end surface of the substrate provided with the optical input port and the optical output port and the input and output optical fibers provided on one surface of a package case. As a result, in the above-mentioned configuration, the crosstalk between the input light and the output light may increase.

As a configuration related to the above-mentioned related art, Japanese Laid-open Patent Publication No. 2015-172630 discloses a configuration in which two output optical fibers disposed on one surface of a package case and optical output ends of two optical modulation elements disposed at positions facing the two output optical fibers are optically coupled. In an optical transmission device disclosed in Japanese Laid-open Patent Publication No. 2015-172630, the optical axes of output light beams output from the optical output ends of the two optical modulation elements are translated in different directions by two beam shift prisms, which results in an increase in the distance between the optical axes. Therefore, the degree of spatial separation between the two output light beams increases. As a result, an increase in crosstalk between the output light beams is suppressed, and the distance between the two optical fibers disposed on one surface of the package case increases, which makes it possible to improve the workability of adjusting the optical fibers or fixing the optical fibers to the package case.

However, the configuration disclosed in Japanese Laid-open Patent Publication No. 2015-172630 in which two output optical fibers are disposed on one surface of the package case and two output light beams from the two optical modulation elements are propagated to the one surface in the same direction is not an improvement measure to the crosstalk of input light with respect to the output optical fiber in the configuration in which the input optical fiber and the output optical fiber are disposed on one surface of the package case as described above, that is, in the configuration in which the input light and the output light can be propagated to the one surface in opposite directions. Since the input light has no optical loss or modulation loss in the modulation element, the intensity of the input light is 10 dB or more higher than that of the output light, and the influence of the input light is not negligible.

SUMMARY OF THE INVENTION

From the above-mentioned background, in the optical functional device in which both the input optical fiber and the output optical fiber are disposed on one surface of the package case accommodating the optical modulation element, it is necessary to keep the crosstalk between the input light from the input optical fiber and the output light coupled to the output optical fiber low and to achieve good optical characteristics.

According to an aspect of the invention, there is provided an optical functional device including: an optical functional element; a package case that accommodates the optical functional element; an input optical fiber that guides input light to be input to the optical functional element into the package case; and an output optical fiber that guides output light including light output from the optical functional element to an outside of the package case. Both the input optical fiber and the output optical fiber are fixed to one surface of the package case. The optical functional device includes: a first reflecting surface that reflects input light output from the input optical fiber in a direction toward an optical path of the output light; a second reflecting surface that reflects the input light reflected by the first reflecting surface to the optical functional element; and a third reflecting surface that reflects the output light from the optical functional element in a direction in which the output light becomes further away from an optical axis of the input optical fiber. An optical axis of a leaked light beam transmitted through the second reflecting surface after being reflected by the first reflecting surface or an extension line of the optical axis in an optical propagation medium through which the leaked light beam is capable of being propagated, does not include a portion that is aligned with an optical axis of the output light reflected by the third reflecting surface.

According to another aspect of the invention, a shield that shields the leaked light beam may be provided at a position between the second reflecting surface and the third reflecting surface and on the optical axis of the leaked light beam transmitted through the second reflecting surface after being reflected by the first reflecting surface.

According to still another aspect of the invention, the optical axis of the leaked light beam transmitted through the second reflecting surface after being reflected by the first reflecting surface or the extension line of the optical axis maybe separated from the optical axis of the output light reflected by the third reflecting surface by a distance that is greater than a value of a diameter of the leaked light beam.

According to yet another aspect of the invention, the optical axis of the leaked light beam transmitted through the second reflecting surface after being reflected by the first reflecting surface may not be parallel to the optical axis of the output light reflected by the third reflecting surface.

According to still yet another aspect of the invention, the third reflecting surface may not be disposed on the extension line of the optical axis of the leaked light beam transmitted through the second reflecting surface after being reflected by the first reflecting surface.

According to yet still another aspect of the invention, the optical functional element may include optical waveguides formed on a substrate, and an end portion of an input waveguide that receives the input light and an end portion of an output waveguide that outputs the output light may be disposed on the same end surface of the substrate.

According to the invention, in the optical functional device in which both the input optical fiber and the output optical fiber are disposed on one surface of the package case accommodating the optical modulation element, it is possible to keep the crosstalk between the input light from the input optical fiber and the output light coupled to the output optical fiber low and to achieve good optical characteristics.

DETAILED DESCRIPTION OF THE INVENTION

Hereinafter, embodiments of the invention will be described with reference to the drawings.

First Embodiment

Figure 1:
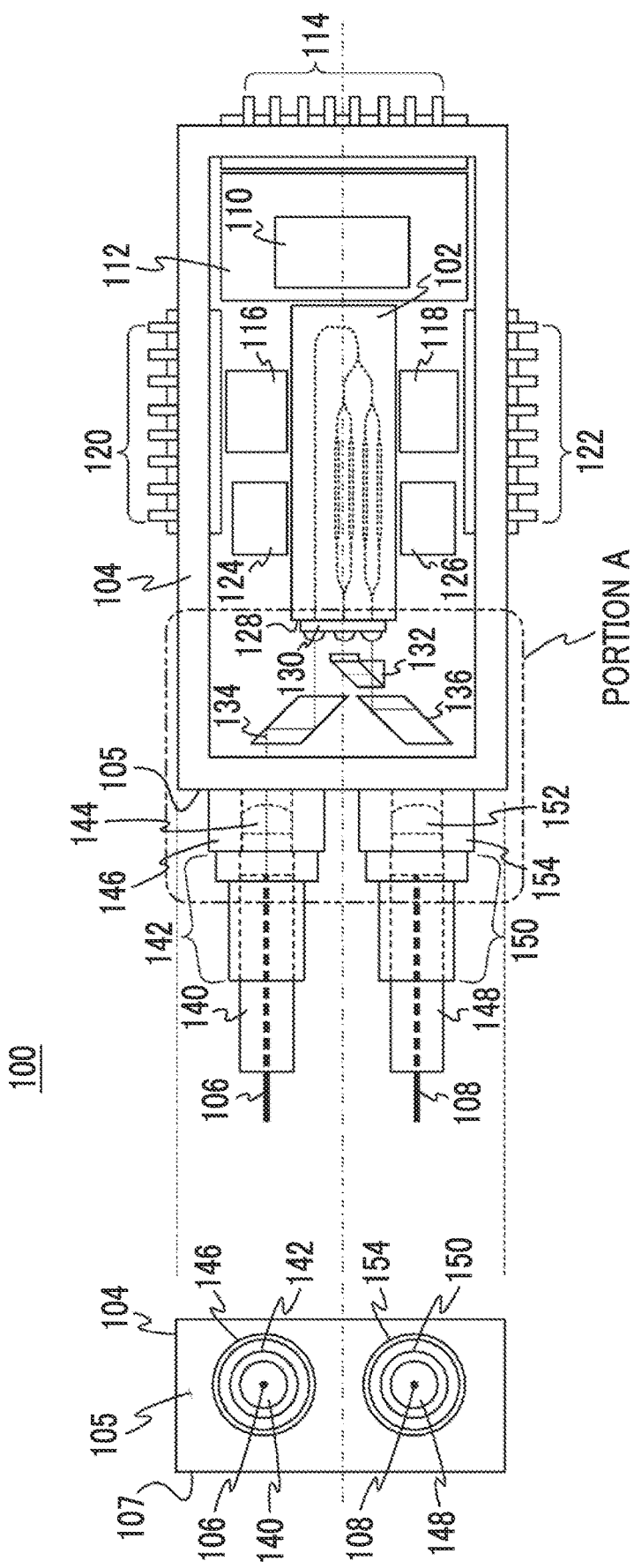
FIG. 1 is a diagram illustrating a configuration of an optical modulation device according to a first embodiment of the invention.
Figure 2:
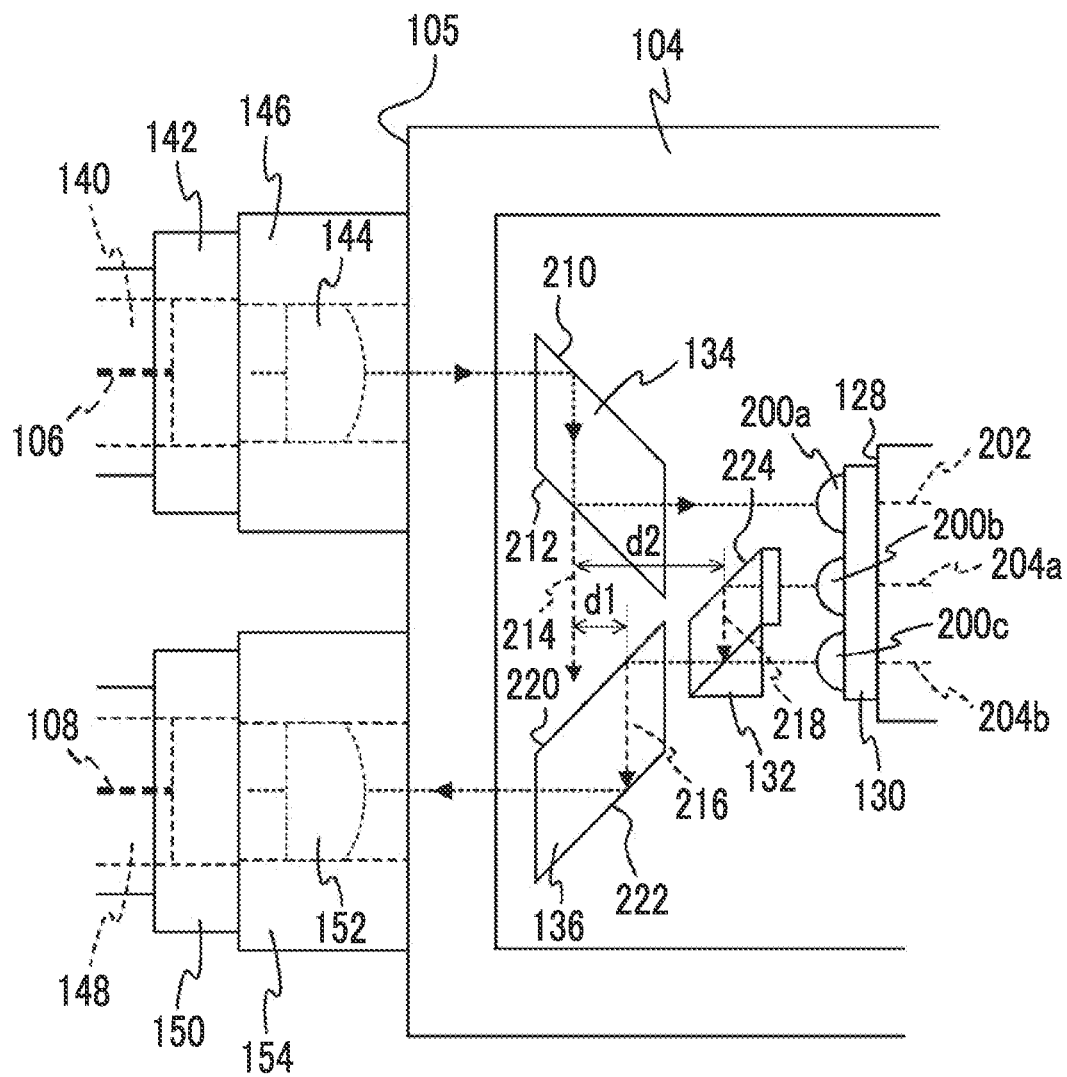
FIG. 2 is a partial detailed view illustrating a portion A of the optical modulation device illustrated in FIG. 1.

First, a first embodiment of the invention will be described. FIG. 1 is a diagram illustrating a configuration of an optical modulation device which is an optical functional device according to the first embodiment of the invention. Right and left views in FIG. 1 are a plan view and a side view of an optical modulation device 100, respectively. In addition, FIG. 2 is a partial detailed view illustrating a portion A in the plan view on the right side in FIG. 1.

The optical modulation device 100 includes, for example, an optical modulation element 102 which is an optical functional element performing optical modulation, a package case 104 that accommodates the optical modulation element 102, an input optical fiber 106 that introduces input light to the optical modulation element 102, and an output optical fiber 108 that guides modulated light output from the optical modulation element 102 to the outside of the package case 104.

The package case 104, for example, a hexahedron that has a substantially rectangular shape in a plan view in which the length of a long side is about 30 mm and the length of a short side is about 12 mm. The input optical fiber 106 and the output optical fiber 108 are disposed on one surface 105 that has, as one side, the left short side in FIG. 1. Further, each of the input optical fiber 106 and the output optical fiber 108 is optically coupled to the optical modulation element 102 through a window (not illustrated) that is provided in the surface 105 of the package case 104.

The input optical fiber 106 and the output optical fiber 108 are disposed in parallel at two individual positions on one surface 105 of the package case 104 by two different sets of holding members. The input optical fiber 106 is fixed to the package case 104 by a ferrule 140 forming one set of holding members, a sleeve 142 with a flange, and a lens holder 146 in which a lens 144 is fixed. Similarly, the output optical fiber 108 is fixed to the package case 104 by a ferrule 148 forming an other set of holding members, a sleeve 150 with a flange, and a lens holder 154 in which a lens 152 is fixed.

In addition, the package case 104 accommodates a circuit substrate 112 on which a driver circuit 110 for operating the optical modulation element 102 is mounted. The driver circuit 110 includes an amplifier for amplifying a modulation signal. However, the driver circuit 110 may include a signal processing IC (DSP) in addition to the amplifier. The driver circuit is not necessarily mounted on the substrate. The circuit substrate may be disposed and connected around an IC of the driver circuit, and the IC may be mounted on the package case directly or through a heat dissipation member for heat dissipation. Further, a ceramic package in which the circuit substrate and the package case are integrated may be used. In addition, the package case 104 is provided with a plurality of pins 114 that receive modulation signals supplied from the outside. Power for the driver circuit and control signals are connected to pins 120 and 122 that are provided on a side wall of the package case 104. The package case 104 accommodates relay substrates 116 and 118 that relay an electric signal output from a monitoring light-receiving element (not illustrated) included in the optical modulation element 102. The pins 120 and 122 that output the electric signal to the outside of the package case 104 are provided on the side wall of the package case 104. The pins 120 and 122 may be disposed on only one surface.

The optical modulation element 102 includes, for example, optical waveguides (a one-dot chain line in the drawings) that are formed on an LN substrate and a plurality of electrodes (not illustrated) that control light waves propagated through the optical waveguides. The electrodes form a high-frequency transmission line. A high-frequency signal output by the driver circuit 110 is input to one end of each of the electrodes, and terminators 124 and 126 that have substantially the same impedance as the transmission line are connected to the other ends of the electrodes. Therefore, the high-frequency signal is propagated as a traveling wave to the electrode, and the light input to the optical modulation element 102 is modulated by the high-frequency signal.

The two relay substrates 116 and 118 are disposed on the upper and lower sides in FIG. 1, with the optical modulation element 102 interposed between the two relay substrates 116 and 118, for connection to the pins 120 and 122 provided on the upper and lower side walls of the package case 104 which face each other in FIG. 1, respectively. In addition, the two terminators 124 and 126 are disposed on the upper and lower sides in FIG. 1, with the optical modulation element 102 interposed between the two terminators 124 and 126, for example, for the ease of the disposition of the electrodes on the LN substrate. Further, it is desirable that a plurality of high-frequency wiring lines from the pins 114 to the optical modulation element are disposed as short wiring lines so as to be substantially centrally symmetric in order to prevent the deterioration or attenuation of the high-frequency signal and to suppress a difference in characteristics between ports. As a result, for example, the optical modulation element 102 is disposed at the center of the package case 104 in the width direction (the vertical direction in FIG. 1) in order to secure a space for disposing the relay substrates 116 and 118 and the terminators 124 and 126 on the upper and lower sides of the optical modulation element 102 in FIG. 1, respectively.

The optical modulation element 102 is, for example, a modulation element that performs DP-QPSK modulation. Input light which is a single linearly polarized light beam is input from an optical input and output surface 128 which is a left end surface in FIG. 1. The input light is input to an input waveguide 202 (FIG. 2) having an end portion disposed on the optical input and output surface 128 and is branched into two light waves while being refracted in the optical modulation element 102. Then, each of the two light waves is modulated. Two output light beams which are the modulated linearly polarized light beams are output from two output waveguides 204a and 204b having end portions provided on the optical input and output surface 128, respectively. That is, in the optical modulation element 102, the end portion of the input waveguide 202 which receives the input light and the end portions of the output waveguides 204a and 204b which output the output light are disposed on the same end surface (specifically, the optical input and output surface 128) of the substrate on which the optical waveguides are formed. In addition, a microlens array 130 including three lenses 200a, 200b, and 200c (FIG. 2) is disposed on the optical input and output surface 128 of the optical modulation element 102.

In an optical functional element including optical waveguides formed on a substrate, such as the optical modulation element 102, in general, a waveguide clearance between the input waveguide 202 and the output waveguides 204a and 204b on the optical input and output surface 128 is in the range of about several hundreds of micrometers to several millimeters or less. It is difficult to dispose the input optical fiber 106 and the output optical fiber 108 on the surface 105 of the package case 104 at the same clearance as described above. In addition, as described above, the optical modulation element 102 is generally disposed in a central portion of the package case 104 in the width direction. A lens holder or a ferrule is fixed to the package case at a plurality of points in the outer periphery of the lens holder or the ferrule by a means, such as YAG welding. Therefore, a large clearance between the input optical fiber 106 and the output optical fiber 108 makes it easy to perform the welding. Further, in general, the input optical fiber 106 and the output optical fiber 108 are disposed at positions that are symmetric with respect to a center line of the package case 104 in the width direction in order to avoid the influence of the distortion of the package case 104 caused by, for example, a fluctuation in environmental temperature.

Therefore, in the optical modulation device 100, two beam shift prisms 134 and 136 are used to shift the optical axis of the input optical fiber 106 and the optical axis of the output optical fiber 108 in the translation direction such that the clearance between the optical axes becomes equal to the clearance between the waveguides. For example, the beam shift prisms 134 and 136 are disposed so as to shift the input light from the input optical fiber 106 and the output light to the output optical fiber 108 in the translation direction in a plane that is parallel to a bottom surface 107 (the left view in FIG. 1) of the package case 104.

Referring to FIG. 2, the input light input from the input optical fiber 106 is collimated by the lens 144, and the optical path of the input light is shifted in a direction toward the optical axis of the output optical fiber 108 in the translation direction by the beam shift prism 134. Then, the input light is condensed by the lens 200a of the microlens array 130 and is input to the input waveguide 202. Here, the beam shift prism 134 has two reflecting surfaces 210 and 212. The reflecting surface 210 corresponds to a first reflecting surface that reflects the input light output from the input optical fiber 106 in direction toward the optical path of the output light, and the reflecting surface 212 corresponds to a second reflecting surface that reflects the input light reflected by the reflecting surface 210 to the optical modulation element 102 which is an optical functional element.

Further, two output light components which are linearly polarized light beams output from the output waveguides 204a and 204b of the optical modulation element 102 are collimated by the two lenses 200b and 200c of the microlens array 130 and are combined into one output light component by a polarization beam combiner 132. The polarization beam combiner 132 includes, for example, a half-wavelength plate and a polarization beam combining prism.

The optical path of the output light output from the polarization beam combiner 132 is shifted in a direction toward the optical axis of the output optical fiber 108 in the translation direction by the beam shift prism 136. Then, the output light is condensed by the lens 152 and is then coupled to the output optical fiber 108. Here, the beam shift prism 136 has two reflecting surfaces 220 and 222. The reflecting surface 220 corresponds to a third reflecting surface that reflects the output light from the optical modulation element 102 which is an optical functional element in a direction in which the output light becomes further away from the optical axis of the input optical fiber 106.

Then, in particular, the optical modulation device 100 according to this embodiment is configured such that, among the input light beams reflected in a direction toward the optical path of the output light by one reflecting surface 210 of the beam shift prism 134, an optical axis 214 of a leaked light beam transmitted through the other reflecting surface 212 of the beam shift prism 134 or an extension line of the optical axis 214 in an optical propagation medium in which the leaked light beam can be propagated (hereinafter, simply referred to as an optical propagation medium) does not include a portion that is aligned with the optical axis of the output light reflected by the reflecting surface 220 of the beam shift prism 136. Here, the optical propagation medium includes a solid medium such as glass, a gas medium, and a vacuum space, through which the leaked light beam can be propagated and does not include an object, such as metal, through which the leaked light beam is not capable of being transmitted.

In general, for a boundary surface between two different media through which light is propagated (for example, a light reflecting surface and a light transmitting surface), some of the input light beams to the boundary surface may be branched and propagated in a direction different from that of other input light beams due to, for example, slight dirt on the boundary surface or the disturbance of smoothness. Therefore, for the reflecting surfaces, such as the reflecting surfaces 210, 212, 220, and 222, for example, the leaked light beams transmitted through the reflecting surfaces are generated and become stray light, which may cause the deterioration of crosstalk between the input light and the output light.

In contrast, in the optical modulation device 100 having the above-mentioned configuration, the optical axis 214 of the leaked light beam that is transmitted through the reflecting surface 212 and travels in the direction toward the optical path of the output light does not include a portion that is aligned with an optical axis 216 of the output light reflected by the reflecting surface 220 in a direction in which the output light becomes further away from the input optical fiber 106. For this reason, the leaked light beam is not mixed with the output light reflected by the reflecting surface 220. Therefore, in the optical modulation device 100, it is possible to effectively suppress an increase in crosstalk of the input light with respect to the output light (hereinafter, simply referred to as "crosstalk") caused by the introduction of the beam shift prism 134 and/or the beam shift prism 136.

In addition, from the viewpoint of effectively suppressing an increase in crosstalk, it is desirable that a distance d1 between the optical axis 214 of the leaked light beam transmitted through the reflecting surface 212 among the input light beams or the extension line of the optical axis 214 in the optical propagation medium and the optical axis 216 of the output light reflected by the reflecting surface 220 in the same direction as the leaked light beam is a value greater than the diameter of the leaked light beam. That is, for the optical axis 214 of the leaked light beam that is reflected by the reflecting surface 210 which is the first reflecting surface and is then transmitted through the reflecting surface 212 which is the second reflecting surface, it is desirable that the optical axis 214 or the extension line of the optical axis 214 in the optical propagation medium is separated from the optical axis 216 of the output light reflected by the reflecting surface 220 which is the third reflecting surface by the distance d1 greater than the value of the diameter of the leaked light beam. Further, hereinafter, for example, "the reflecting surface 210 which is the first reflecting surface" is abbreviated to "the first reflecting surface 210" or the like in order to avoid redundant description.

Next, modification examples of the optical modulation device 100 according to the above-described embodiment will be described.

First Modification Example of First Embodiment

Figure 3:
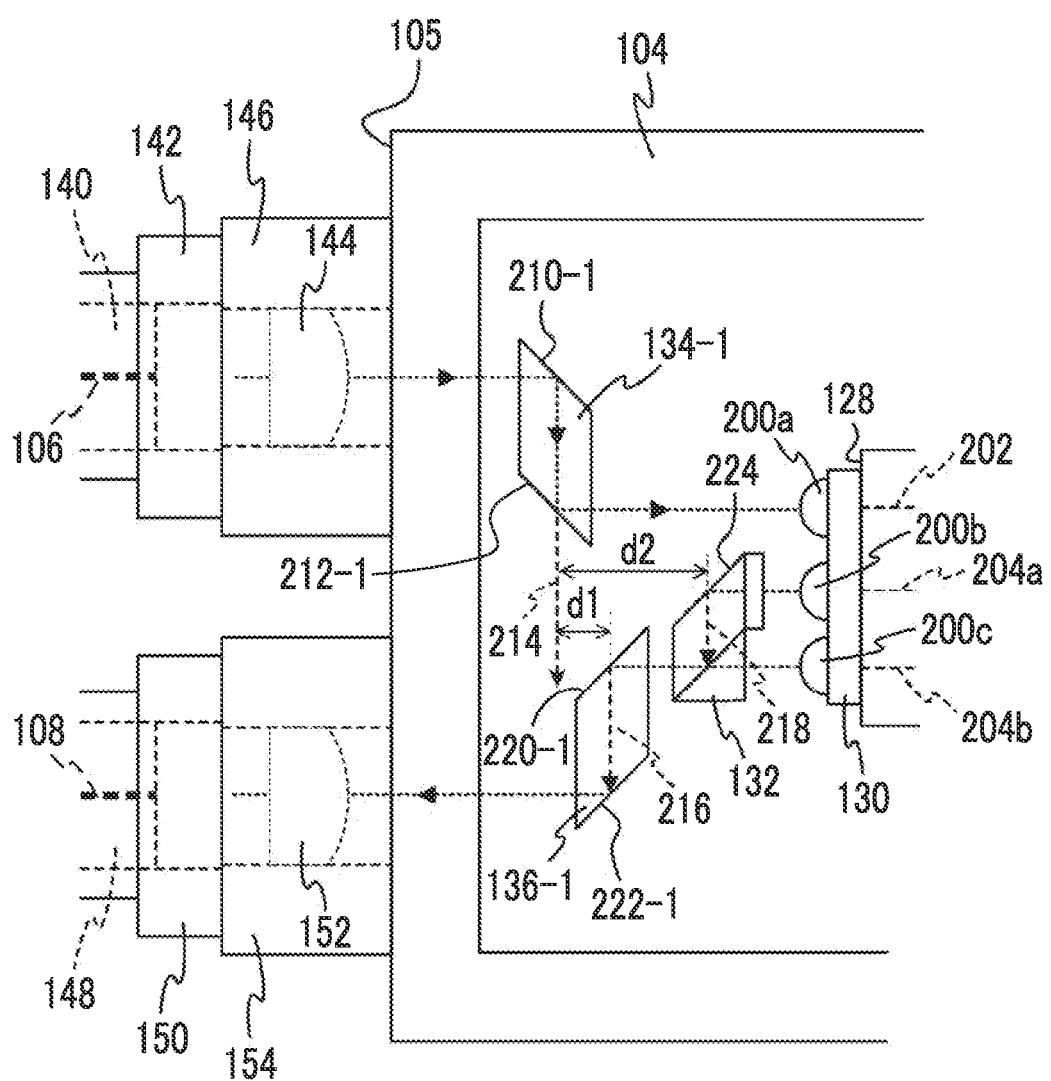
FIG. 3 is a partial detailed view illustrating an optical modulation device according to a first modification example of the first embodiment.

Next, a first modification example of the optical modulation device 100 will be described. FIG. 3 is a diagram illustrating the configuration of an optical modulation device 100-1 according to the first modification example and is a diagram corresponding to FIG. 2 illustrating the configuration of the portion A of the optical modulation device 100. In addition, in the optical modulation device 100-1, a portion that is not illustrated in FIG. 3 has the same configuration as that in the optical modulation device 100 illustrated in FIG. 1, and the above description of FIG. 1 is quoted. Further, in FIG. 3, the same components as the components of the optical modulation device 100 illustrated in FIG. 2 are denoted by the same reference numerals as those in FIG. 2, and the above description of FIG. 1 is quoted.

The optical modulation device 100-1 illustrated in FIG. 3 has the same configuration as the optical modulation device 100 illustrated in FIGS. 1 and 2 except that beam shift prisms 134-1 and 136-1 are used instead of the beam shift prisms 134 and 136, respectively. The beam shift prisms 134-1 and 136-1 have the same configuration as the beam shift prisms 134 and 136 except that the size of the beam shift prisms 134-1 and 136-1 in the left-right direction in FIG. 3 (a distance between the optical input and output surfaces facing each other in the left-right direction in FIG. 3) is smaller than that in the beam shift prisms 134 and 136.

The beam shift prism 134-1 has reflecting surfaces 210-1 and 212-1 which are the same as the reflecting surfaces 210 and 212 of the beam shift prism 134 and correspond to the first reflecting surface and the second reflecting surfaces, respectively. Similarly, the beam shift prism 136-1 has reflecting surfaces 220-1 and 222-1 which are the same as the reflecting surfaces 220 and 222 of the beam shift prism 136, respectively. Here, the reflecting surface 220-1 corresponds to the third reflecting surface.

In the optical modulation device 100-1 illustrated in FIG. 3, the path of the input light and the path of the output light are the same as those in the optical modulation device 100 illustrated in FIG. 2. However, as described above, since the distances between the optical input and output surfaces of the beam shift prisms 134-1 and 136-1 are shorter than those in the beam shift prisms 134 and 136, the beam shift prisms 134-1 and 136-1 are disposed in the package case 104 such that the positions of the beam shift prisms 134-1 and 136-1 in the left-right direction in FIG. 3 are different from each other.

Therefore, in the optical modulation device 100-1, similarly to the optical modulation device 100, a leaked light beam transmitted through the reflecting surface 212-1 among the input light beams is not mixed with the output light reflected by the reflecting surface 220-1, and it is possible to effectively suppress an increase in crosstalk.

In addition, in the optical modulation device 100-1, the beam shift prisms 134-1 and 136-1 are disposed so as to deviate from each other in the left-right direction in FIG. 3. Therefore, not only the beam shift prism 136-1 but also other optical components do not exist on the extension line of the optical axis 214 of the leaked light beam transmitted through the reflecting surface 212-1. Therefore, in the optical modulation device 100-1, the generation of scattered light caused by the input or reflection of the leaked light beam to or from other optical components is avoided, and it is possible to further suppress the crosstalk as compared to the optical modulation device 100.

Second Modification Example of First Embodiment

Figure 4:
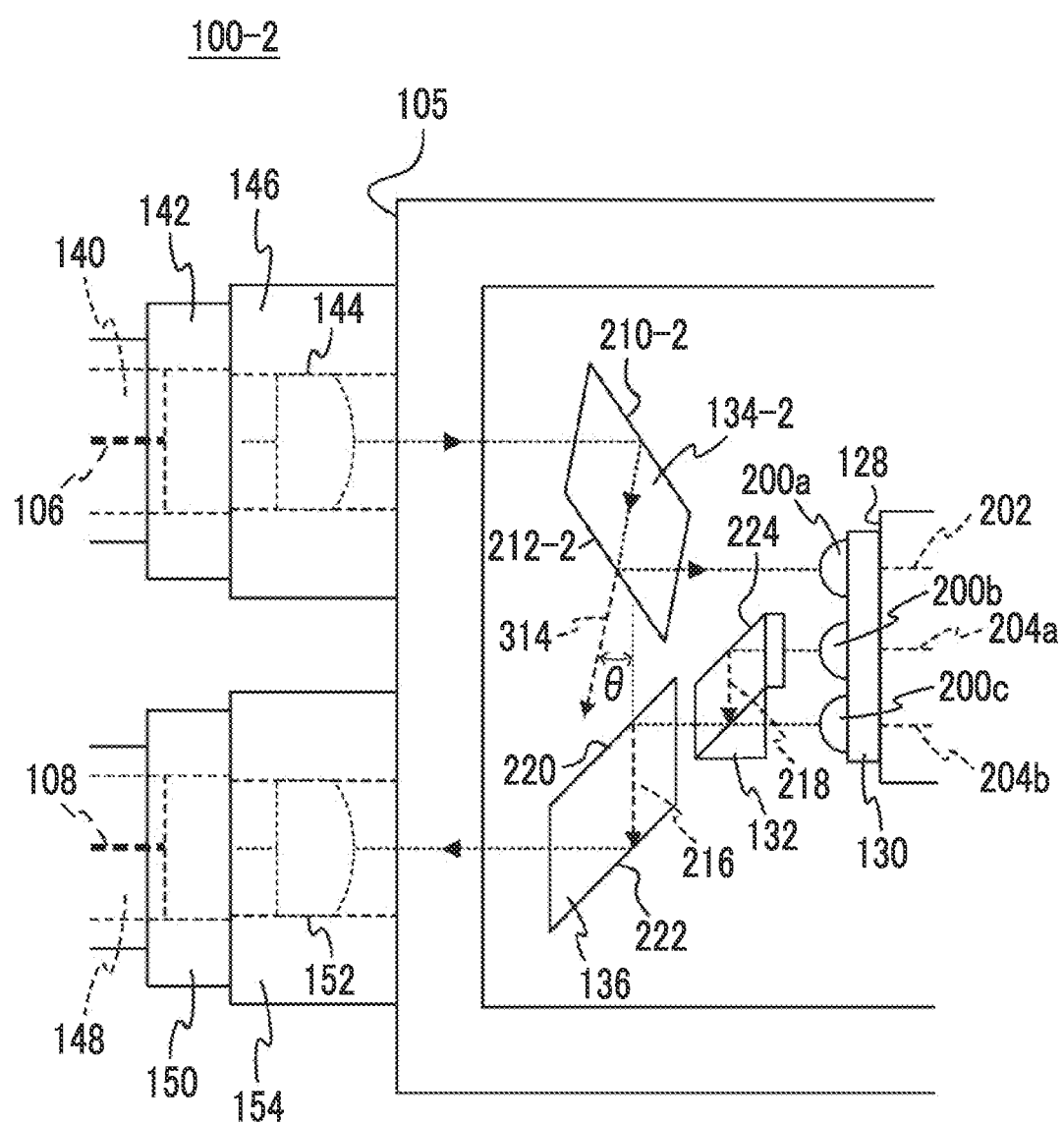
FIG. 4 is a partial detailed view illustrating an optical modulation device according to a second modification example of the first embodiment.

Next, a second modification example of the optical modulation device 100 will be described. FIG. 4 is a diagram illustrating the configuration of an optical modulation device 100-2 according to the second modification example and is a diagram corresponding to FIG. 2 illustrating the configuration of the portion A of the optical modulation device 100. In addition, in the optical modulation device 100-2, a portion that is not illustrated in FIG. 4 has the same configuration as that in the optical modulation device 100 illustrated in FIG. 1, and the above description of FIG. 1 is quoted. Further, in FIG. 4, the same components as the components of the optical modulation device 100 illustrated in FIG. 2 are denoted by the same reference numerals as those in FIG. 2, and the above description of FIG. 2 is quoted.

The optical modulation device 100-2 illustrated in FIG. 4 has the same configuration as the optical modulation device 100 illustrated in FIGS. 1 and 2 except that a beam shift prism 134-2 is used instead of the beam shift prism 134. The beam shift prism 134-2 has the same configuration as the beam shift prism 134 and has reflecting surfaces 210-2 and 212-2 which are the same as the reflecting surfaces 210-2 and 212 and correspond to the first reflecting surface and the second reflecting surface, respectively.

However, the beam shift prism 134-2 is different from the beam shift prism 134 in that it is disposed so as to be inclined with respect to the beam shift prism 136 in a clockwise direction. That is, the optical modulation device 100-2 is configured such that an optical axis 314 of a leaked light beam which is reflected by the first reflecting surface 210-2 and is then transmitted through the second reflecting surface 212-2 is not parallel to the optical axis of the third reflecting surface 220 and is inclined at a certain angle θ that is not zero with respect to the optical axis of the third reflecting surface 220. Therefore, similarly to the optical modulation device 100, the optical modulation device 100-2 is configured such that the optical axis 314 of a leaked light beam transmitted through the second reflecting surface 212-2 among the input light beams reflected in a direction toward the optical path of the output light by the first reflecting surface 210-2 or the extension line of the optical axis 314 in the optical propagation medium does not have a portion that is aligned with the optical axis 216 of the output light reflected by the third reflecting surface 220.

With the above configuration, in the optical modulation device 100-2, similarly to the optical modulation device 100, the leaked light beam is not mixed with the output light reflected by the reflecting surface 220. Therefore, it is possible to effectively suppress an increase in crosstalk caused by the introduction of the beam shift prism 134-2 and/or the beam shift prism 136.

Third Modification Example of First Embodiment

Next, a third modification example of the optical modulation device 100 will be described. In the optical modulation device 100 illustrated in FIG. 2, the reflecting surfaces 210 and 212 which are the first reflecting surface and the second reflecting surface, respectively, form one beam shift prisms 134, and the reflecting surface 220 which is the third reflecting surface forms the other beam shift prism 136. However, the first reflecting surface, the second reflecting surface, and the third reflecting surface do not necessarily form the beam shift prisms as in this embodiment. These reflecting surfaces may form any optical components, and the optical components may be disposed in any pattern. Further, in a case in which there are a plurality of output light beams output from the optical functional element (for example, the optical modulation element 102), there may be a plurality of third reflecting surfaces corresponding to the output light beams.

An optical modulation device 100-3 according to the third modification example described below is an example of the above-mentioned configuration, and a plurality of third reflecting surfaces form a multi-functional prism having both a beam shift function and a polarization combining function.

Figure 5:
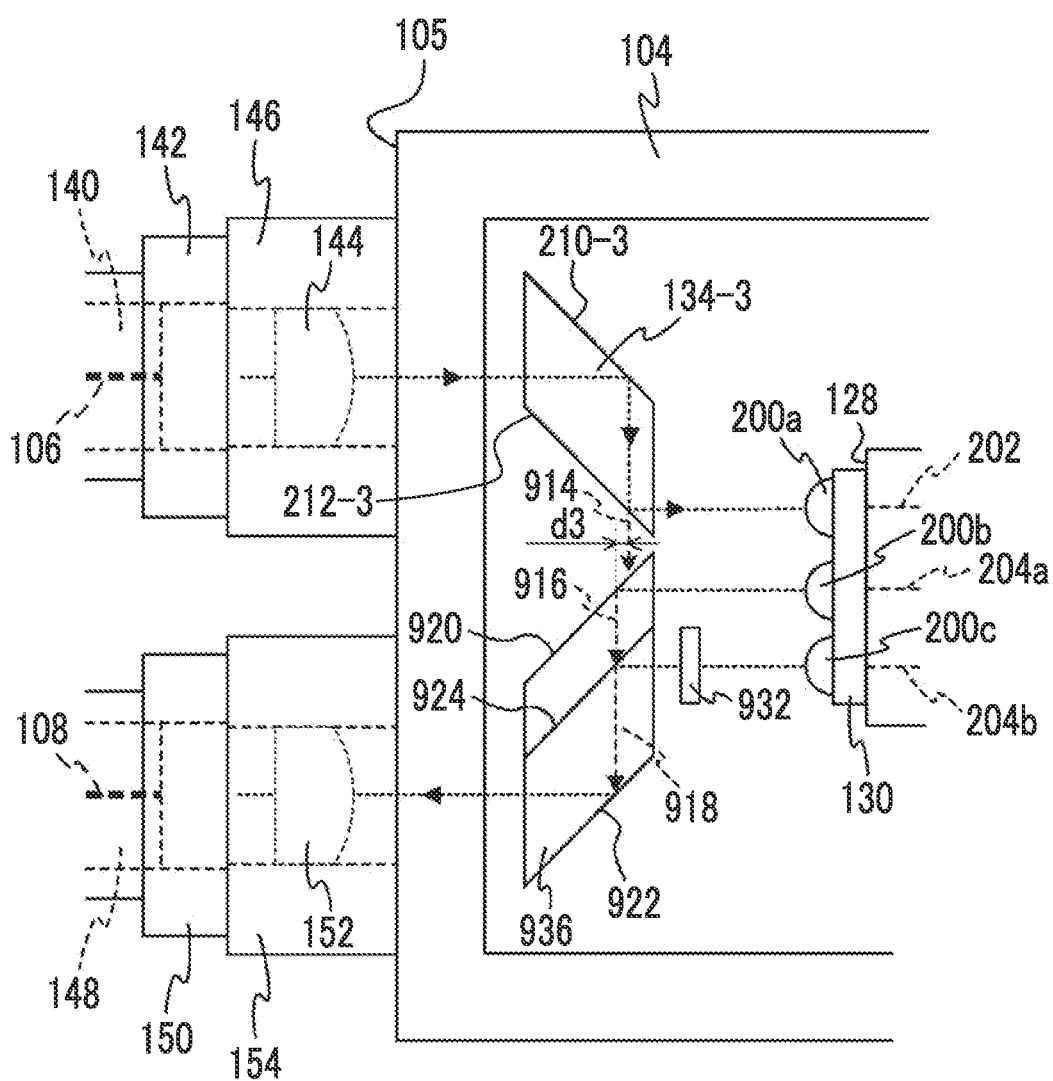
FIG. 5 is a partial detailed view illustrating an optical modulation device according to a third modification example of the first embodiment.

FIG. 5 is a diagram illustrating the configuration of the optical modulation device 100-3 according to the third modification example and is a diagram corresponding to FIG. 2 illustrating the configuration of the portion A of the optical modulation device 100. In addition, in the optical modulation device 100-3, a portion that is not illustrated in FIG. 5 has the same configuration as that in the optical modulation device 100 illustrated in FIG. 1, and the above description of FIG. 1 is quoted. Further, in FIG. 5, the same components as the components of the optical modulation device 100 illustrated in FIG. 2 are denoted by the same reference numerals as those in FIG. 2, and the above description of FIG. 2 is quoted.

The optical modulation device 100-3 illustrated in FIG. 5 has the same configuration as the optical modulation device 100 illustrated in FIGS. 1 and 2 except that a beam shift prism 134-3 is used instead of the beam shift prism 134 and a beam shift prism 936 is used instead of the prism 136. The beam shift prism 134-3 has the same configuration as the beam shift prism 134 and has reflecting surfaces 210-3 and 212-3 which are the same as the reflecting surfaces 210 and 212 of the beam shift prism 134 and correspond to the first reflecting surface and the second reflecting surface, respectively. However, the position of the beam shift prism 134-3 in the package case 104 deviates from the position of the beam shift prism 134 in the upward direction in FIG. 5.

Unlike the beam shift prism 136, the prism 936 has both the beam shift function and the polarization combining function. Specifically, the prism 936 has two reflecting surfaces 920 and 924 corresponding to the third reflecting surface. The reflecting surface 920 is a total reflecting surface, and the reflecting surface 924 includes, for example, a polarization combining film that is formed at a boundary surface between two glasses. Then, the reflecting surfaces 920 and 924 reflect two linearly polarized light beams forming the output light, respectively. That is, the reflecting surface 920 reflects one linearly polarized light beam output from the output waveguide 204a. The reflecting surface 924 transmits the one linearly polarized light beam and reflects the other linearly polarized light beam which has been output from the output waveguide 204b and whose polarization direction has been rotated by 90 degrees through a half-wavelength plate 932. Therefore, the prism 936 functions as a polarization beam combiner. The prism 936 has a reflecting surface 922 that reflects the polarization-combined output light to the output optical fiber 108. Therefore, the prism 936 also functions as a beam shift prism.

Then, the optical modulation device 100-3 is configured such that an optical axis 914 of the leaked light beam transmitted through the reflecting surface 212-3 which is the second reflecting surface among the input light beams is separated from optical axes 916 and 918 of the output light reflected from the two reflecting surfaces 920 and 924 corresponding to the third reflecting surface by a distance d3.

Therefore, in the optical modulation device 100-3, similarly to the optical modulation device 100, the leaked light beam transmitted through the second reflecting surface 212-3 is not mixed with the output light reflected by each of the third reflecting surfaces 920 and 924, and it is possible to effectively suppress an increase in crosstalk.

Fourth Modification Example of First Embodiment

Figure 6:
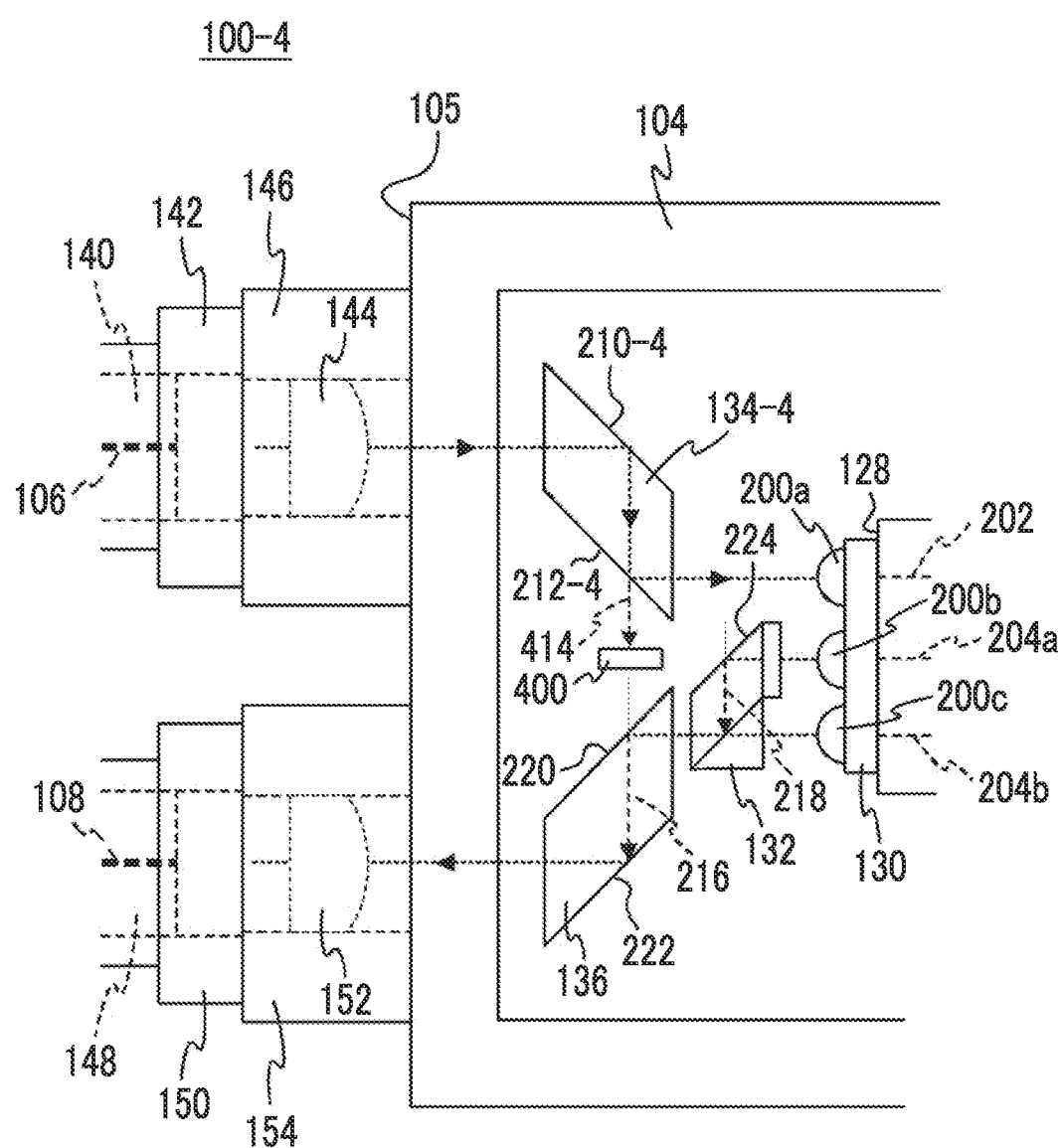
FIG. 6 is a partial detailed view illustrating an optical modulation device according to a fourth modification example of the first embodiment.

First, a fourth modification example of the optical modulation device 100 will be described. FIG. 6 is a diagram illustrating the configuration of an optical modulation device 100-4 according to the fourth modification example and is a diagram corresponding to FIG. 2 illustrating the configuration of the portion A of the optical modulation device 100. In the optical modulation device 100-4, a portion that is not illustrated in FIG. 6 has the same configuration as that in the optical modulation device 100 illustrated in FIG. 1, and the above description of FIG. 1 is quoted. Further, in FIG. 6, the same components as the components of the optical modulation device 100 illustrated in FIG. 2 are denoted by the same reference numerals as those in FIG. 2, and the above description of FIG. 2 is quoted.

The optical modulation device 100-4 illustrated in FIG. 6 has the same configuration as the optical modulation device 100 illustrated in FIGS. 1 and 2 except that a beam shift prism 134-4 is used instead of the beam shift prism 134. The beam shift prism 134-4 has the same configuration as the beam shift prism 134 and has reflecting surfaces 210-4 and 212-4 which are the same as the reflecting surfaces 210 and 212 and correspond to the first reflecting surface and the second reflecting surface, respectively.

However, unlike the beam shift prism 134, in the beam shift prism 134-4, an optical axis 414 of a leaked light beam transmitted through the second reflecting surface 212-4 or an extension line of the optical axis 414 in the optical propagation medium may be aligned with the optical axis 216 of the output light reflected by the third reflecting surface 220 of the beam shift prism 136. Then, in the optical modulation device 100-4, a shield 400 that shields the leaked light beam is provided at a position between the second reflecting surface 212-4 and the third reflecting surface 220 on the optical axis 414 of the leaked light beam which is reflected by the first reflecting surface 210-4 and is then transmitted through the second reflecting surface 212-4. Therefore, the optical modulation device 100-4 may be configured such that the optical axis 414 of the leaked light beam transmitted through the second reflecting surface 212-4 among the input light beams reflected in a direction toward the optical path of the output light by the first reflecting surface 210-4 or the extension line of the optical axis 414 in the optical propagation medium does not include a portion that is aligned with the optical axis 216 of the output light reflected by the third reflecting surface 220.

Here, the shield 400 may be, for example, a black-plated aluminum plate or the like. Further, for example, the shield 400 may be disposed in the package case 104 together with the beam shift prism 136 by fixing the shield 400 to a pedestal (not illustrated) to which the beam shift prism 136 is fixed and fixing the pedestal to the bottom surface of the package case 104.

With the above-mentioned configuration, in the optical modulation device 100-4, similarly to the optical modulation device 100, the leaked light beam is not mixed with the output light reflected by the reflecting surface 220. Therefore, it is possible to effectively suppress an increase in crosstalk caused by the introduction of the beam shift prism 134-4 and/or the beam shift prism 136.

Second Embodiment

Figure 7:
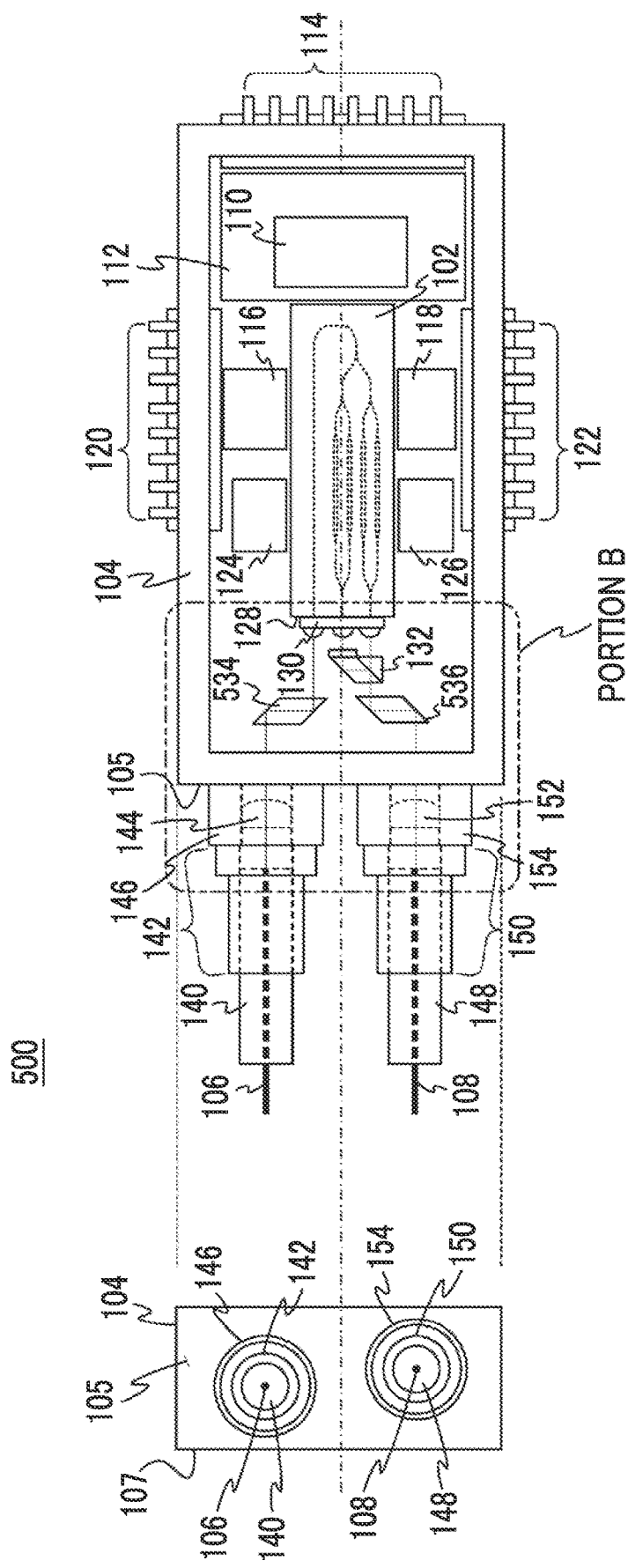
FIG. 7 is a diagram illustrating a configuration of an optical modulation device according to a second embodiment of the invention.
Figure 8:
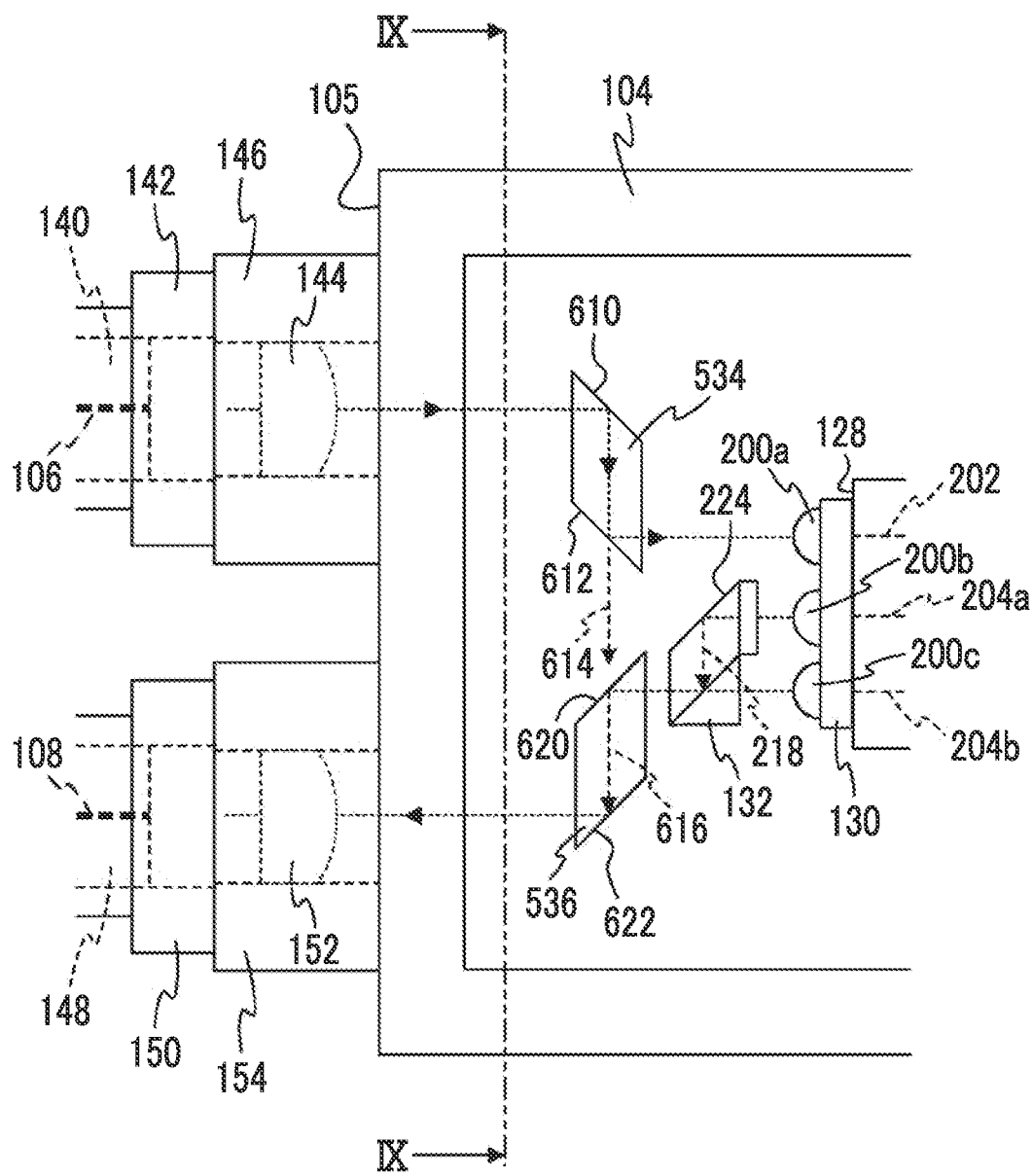
FIG. 8 is a partial detailed view illustrating a portion B of the optical modulation device illustrated in FIG. 7.
Figure 9:
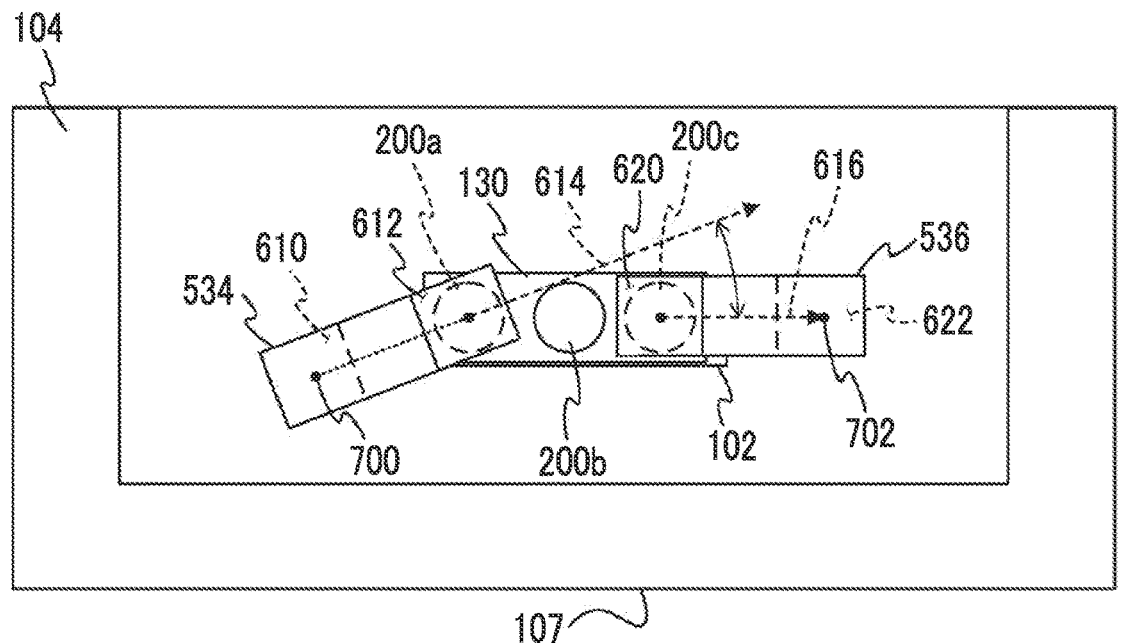
FIG. 9 is a cross-sectional view illustrating the portion B taken along the line IX-IX of FIG. 8.

Next, a second embodiment of the invention will be described. FIG. 7 is a diagram illustrating a configuration of an optical modulation device 500 which is an optical functional device according to the second embodiment. Right and left views in FIG. 7 are a plan view and a side view of the optical modulation device 500, respectively. In addition, FIG. 8 is a partial detailed view illustrating a portion B in the plan view on the right side in FIG. 7, and FIG. 9 is a cross-sectional view taken along the line VI-VI of FIG. 8. In addition, the description of the polarization beam combiner 132 and the description of, for example, a pedestal for fixing the optical modulation element 102 and other optical components are omitted in FIG. 9 in order to avoid redundant description and to facilitate understanding.

In FIGS. 7 and 8, the same components as the components of the optical modulation device 100 according to the first embodiment illustrated in FIGS. 1 and 2 are denoted by the same reference numerals as those in FIGS. 1 and 2, and the above description of FIGS. 1 and 2 is quoted.

The optical modulation device 500 has the same configuration as the optical modulation device 100 illustrated in FIGS. 1 and 2 except that beam shift prisms 534 and 536 are used instead of the beam shift prisms 134 and 136. As illustrated in FIG. 8, the beam shift prism 534 has the same configuration as the beam shift prism 134 and has reflecting surfaces 610 and 612 which are the same as the reflecting surfaces 210 and 212 and correspond to the first reflecting surface and the second reflecting surface, respectively. In addition, the beam shift prism 536 has the same configuration as the beam shift prism 136 and has reflecting surfaces 620 and 622 which are the same as the reflecting surfaces 220 and 222. Here, the reflecting surface 620 corresponds to the third reflecting surface, similarly to the reflecting surface 220.

In particular, in the optical modulation device 500, as illustrated in FIG. 9, the beam shift prism 534 that shifts the input light from the input optical fiber 106 is disposed so as to be inclined with respect to the beam shift prism 536 that is disposed in parallel to the bottom surface 107 of the package case 104 (that is, at an angle with respect to the bottom surface 107). This is the difference between the optical modulation device 500 and the optical modulation device 100 according to the first embodiment in which both the beam shift prisms 134 and 136 are disposed so as to shift the input light from the input optical fiber 106 and the output light to the output optical fiber 108 in the translation direction in a plane that is parallel to the bottom surface 107 of the package case 104. In addition, in FIG. 9, reference numerals 700 and 702 indicate the position of an input point of the input light input from the input optical fiber 106 to the beam shift prism 534 and the position of an output point of the output light output from the beam shift prism 536 to the output optical fiber 108, respectively.

With the above-mentioned configuration, in the optical modulation device 500, an optical axis 614 of the leaked light beam that is reflected by the first reflecting surface 610 of the beam shift prism 534 and is then transmitted through the second reflecting surface 612 is not parallel to an optical axis 616 of the output light reflected by the third reflecting surface 620 of the beam shift prism 536 and has a predetermined angle ψ1 that is not zero with respect to the optical axis 616. Therefore, in the optical modulation device 500, similarly to the optical modulation device 100 illustrated in FIG. 1, the optical axis 614 of the leaked light beam that is reflected by the first reflecting surface 610 and is then transmitted through the second reflecting surface 612 or an extension line of the optical axis 614 in the optical propagation medium does not have a portion that is aligned with the optical axis 616 of the output light reflected by the third reflecting surface 620. As a result, in the optical modulation device 500, similarly to the optical modulation device 100 according to the first embodiment, it is possible to prevent the leaked light beam from being mixed with the output light reflected by the reflecting surface 620 and to effectively suppress an increase in crosstalk caused by the introduction of the beam shift prism 534 and/or the beam shift prism 536.

Next, modification examples of the optical modulation device 500 according to the second embodiment will be described.

First Modification Example of Second Embodiment

Figure 10:
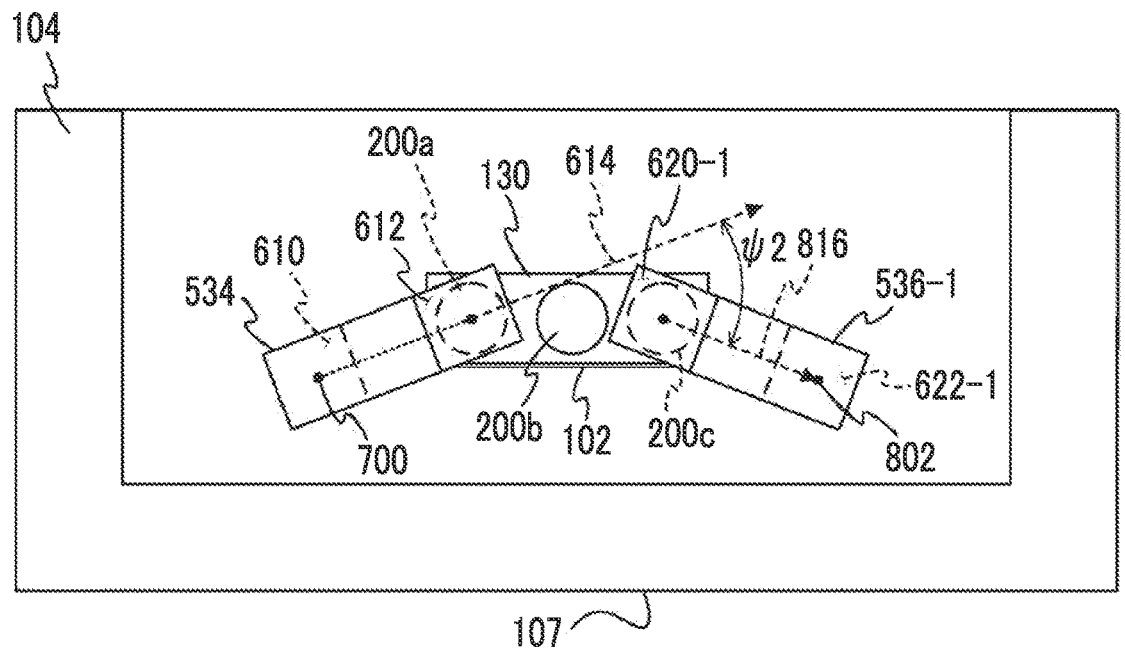
FIG. 10 is a partial detailed view illustrating an optical modulation device according to a first modification example of the second embodiment.

First, a first modification example of the optical modulation device 500 will be described. FIG. 10 is a diagram illustrating the configuration of an optical modulation device 500-1 according to the first modification example and is a diagram corresponding to FIG. 9 illustrating the cross-sectional configuration of the optical modulation device 500 taken along the line IX-IX. In addition, in the optical modulation device 500-1, a portion that is not illustrated in FIG. 10 has the same configuration as that in the optical modulation device 500 illustrated in FIGS. 7 and 8, and the above description of FIGS. 7 and 8 is quoted. Further, in FIG. 10, the same components as the components of the optical modulation device 500 illustrated in FIG. 9 are denoted by the same reference numerals as those in FIG. 9, and the above description of FIG. 9 is quoted.

The optical modulation device 500-1 has the same configuration as the optical modulation device 500 illustrated in FIG. 9 except that a beam shift prism 536-1 is used instead of the beam shift prism 536. The beam shift prism 536-1 has the same configuration as the beam shift prism 536 and has reflecting surfaces 620-1 and 622-1 which are the same as the reflecting surfaces 620 and 622. Here, the reflecting surface 620-1 corresponds to the third reflecting surface, similarly to the reflecting surface 620.

However, in the optical modulation device 500-1, the beam shift prism 536-1 is disposed so as to be inclined with respect to the bottom surface 107 of the package case 104 in a direction opposite to the inclination direction of the beam shift prism 534. Therefore, in the optical modulation device 500-1, the optical axis 614 of the leaked light beam transmitted through the second reflecting surface 612 of the beam shift prism 534 has an angle ψ2 that is larger than the angle ψ1 illustrated in FIG. 9 with respect to an optical axis 816 of the output light reflected by the third reflecting surface 620-1 of the beam shift prism 536-1. As a result, in the optical modulation device 500-1, an increase in crosstalk can be more effectively suppressed than in the optical modulation device 500 illustrated in FIG. 9.

Further, in the optical modulation device 500-1, the inclination angle of the beam shift prism 536-1 can be adjusted to adjust the position of the output point of the output light from the beam shift prism 536-1 represented by reference numeral 802 in FIG. 10. Therefore, in the optical modulation device 500-1, the height of the position (corresponding to the position of the point represented by reference numeral 700) of the optical axis of the input optical fiber 106 from the bottom surface 107 of the package case 104 can be equal to the height of the position (corresponding to the position of the point represented by reference numeral 802) of the optical axis of the output optical fiber 108 from the bottom surface 107. Therefore, in the optical modulation device 500-1, it is possible to dispose the fixation positions of the input optical fiber 106 and the output optical fiber 108 on the surface 105 of the package case 104 so as to be symmetric with respect to a center line of the package case 104 in the width direction (that is, a one-dot chain line traversing the surface 105 in the left-right direction in the left view in FIG. 7)) and to more stably maintain the optical coupling efficiency between the input and output optical fibers 106 and 108 and the optical modulation element 102 against the distortion of the package case 104 caused by, for example, a fluctuation in environmental temperature.

Second Modification Example of Second Embodiment

Figure 11:
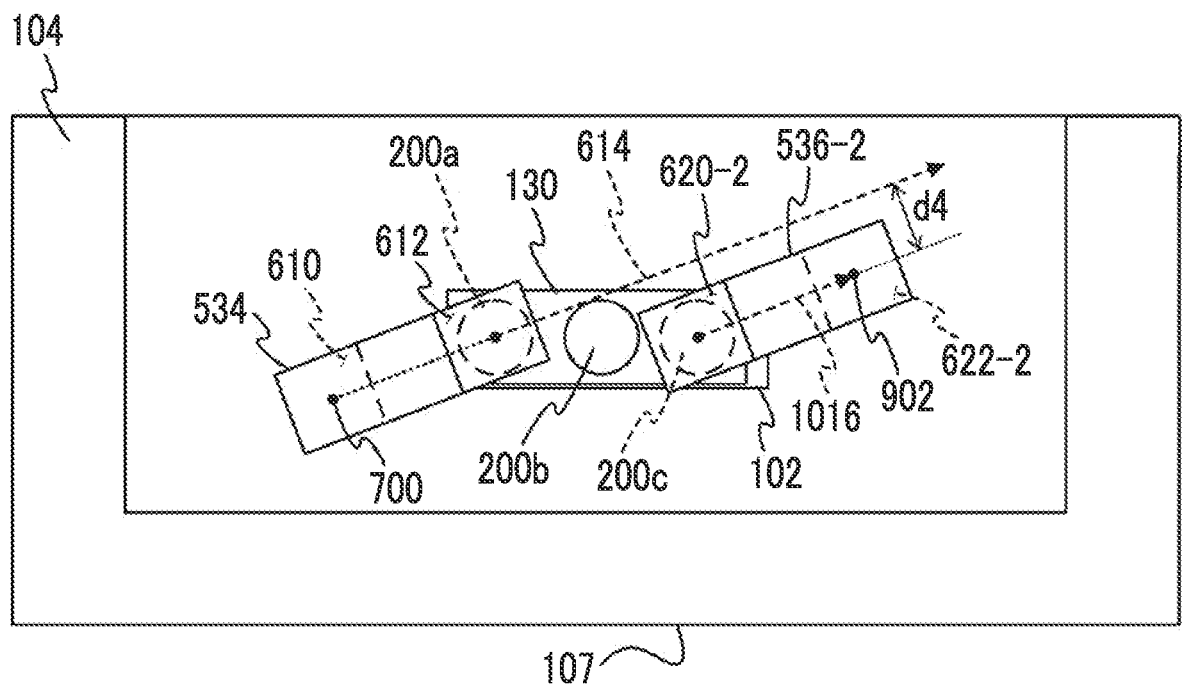
FIG. 11 is a partial detailed view illustrating an optical modulation device according to a second modification example of the second embodiment.

Next, a second modification example of the optical modulation device 500 will be described. FIG. 11 is a diagram illustrating the configuration of an optical modulation device 500-2 according to the second modification example and is a diagram corresponding to FIG. 9 illustrating the cross-sectional configuration of the optical modulation device 500 taken along the line IX-IX. In addition, in the optical modulation device 500-2, a portion that is not illustrated in FIG. 11 has the same configuration as that in the optical modulation device 500 illustrated in FIGS. 7 and 8, and the above description of FIGS. 7 and 8 is quoted. Further, in FIG. 11, the same components as the components of the optical modulation device 500 illustrated in FIG. 9 are denoted by the same reference numerals as those in FIG. 9, and the above description of FIG. 9 is quoted.

The optical modulation device 500-2 has the same configuration as the optical modulation device 500 illustrated in FIG. 9 except that a beam shift prism 536-2 is used instead of the beam shift prism 536. The beam shift prism 536-2 has the same configuration as the beam shift prism 536 and has reflecting surfaces 620-2 and 622-2 which are the same as the reflecting surfaces 620 and 622. Here, the reflecting surface 620-2 corresponds to the third reflecting surface.

However, in the optical modulation device 500-2, the beam shift prism 536-2 is disposed so as to be inclined with respect to the bottom surface 107 of the package case 104 in the same direction as the beam shift prism 534. Therefore, in the optical modulation device 500-2, the optical axis 614 of the leaked light beam transmitted through the second reflecting surface 612 of the beam shift prism 534 may be disposed at a position which is parallel to an optical axis 1016 of the output light reflected by the third reflecting surface 620-2 of the beam shift prism 536-2 and is separated from the optical axis 1016 by a distance d4. In this case, it is desirable that the distance d4 is equal to or greater than the value of the diameter of the leaked light beam.

With the above configuration, in the optical modulation device 500-2, similarly to the optical modulation device 500, it is possible to prevent the leaked light beam transmitted through the second reflecting surface 612 from being mixed with the output light reflected by the third reflecting surface 620-2 and to suppress an increase in crosstalk caused by the introduction of the beam shift prisms 534 and 536-2. Further, in the above-described configuration, the output position of the output light from the beam shift prism 536-2 deviates upward from the output position represented by reference numeral 702 in FIG. 9, as represented by reference numeral 902 in FIG. 11. Therefore, the fixation position of the output optical fiber 108 on the surface 105 of the package case 104 needs to deviate to a position corresponding to the output position.

The invention is not limited to the configurations according to the above-described embodiments and the modification examples of the embodiments and can be embodied in various forms without departing from the scope and spirit of the invention.

For example, in the optical modulation devices 100 and 500 and the optical modulation devices according to the modification examples of the optical modulation devices 100 and 500, the third reflecting surface that reflects the output light from the optical modulation element 102 which is an optical functional element in a direction in which the output light becomes further away from the optical axis of the input optical fiber 106 is the reflecting surface 220, the reflecting surface 620, or the like forming the beam shift prism 136, the beam shift prism 536, or the like that shifts the optical axis of the output light in the translation direction. However, the invention is not limited to the above.

For example, in FIG. 2, in addition to the reflecting surface 220 of the beam shift prism 136 that shifts the output light in the translation direction, a reflecting surface 224 forming the polarization beam combiner 132 may be the third reflecting surface that reflects the output light from the optical modulation element 102 in the direction in which the output light becomes further away from the optical axis of the input optical fiber 106. Therefore, the optical axis 214 of the leaked light beam of the input light which is transmitted through the reflecting surface 212 and travels in a direction toward the path of the output light may be configured such that the optical axis 214 or the extension line of the optical axis 214 in the optical propagation medium does not include a portion that is aligned with an optical axis 218 of the output light reflected by the reflecting surface 224. In this case, it is desirable that a distance d2 (see FIG. 2) between the optical axis 214 of the leaked light beam transmitted through the reflecting surface 212 among the input light beams or the extension line of the optical axis 214 in the optical propagation medium and the optical axis 218 of the output light reflected by the reflecting surface 224 is equal to or greater than the diameter of the leaked light beam, similarly to the distance d1.

Further, in the optical modulation device 100 according to the first embodiment, in FIG. 2, the optical axis 214 of the leaked light beam of the input light is located on the left side of the optical axis 216 of the output light reflected by the reflecting surface 220 and is located on the left side of the optical axis 218 of the output light reflected by the reflecting surface 224. However, the position of the optical axis 214 is not limited to the above. The optical axis 214 of the leaked light beam of the input light may be located on the right side of the optical axes 216 and 218 of two output light beams reflected by the reflecting surfaces 220 and 244 in FIG. 2 or may be located between the optical axes 216 and 218 of the two output light beams as long as the optical axis 214 or the extension line of the optical axis 214 in the optical propagation medium does not include a portion which is aligned with both the optical axes 216 and 218 of the two output light beams reflected by the reflecting surfaces 220 and 224.

Further, in the first embodiment and the second embodiment, the optical modulation devices 100 and 500 having, as an optical functional element, the optical modulation element 102 that includes the optical waveguides formed on the substrate made of LN and performs optical modulation are given as an example of the optical functional device. However, the optical functional device is not limited to the above. The optical functional device according to the invention may be any optical functional device that includes an optical functional element having any functions by any method and implements the functions.

The functions may include, for example, optical switching, polarization rotation, and optical routing as well as optical modulation. Further, the optical functional element is not limited to the element using LN and may be a waveguide-type or bulk-type element using a semiconductor, such as Si, or other materials. Alternatively, in the optical modulation element 102 according to the above-described embodiments, the end portion of the input waveguide 202 that receives the input light and the end portions of the output waveguides 204a and 204b that output the output light among the optical waveguides formed on the substrate are disposed on the optical input and output surface 128 which is one surface of the substrate. However, the invention is not limited to the above. The optical functional element included in the optical functional device according to the invention may be configured such that different surfaces of the optical functional element receive and output any number of input light beams and any number of output light beams.

As described above, the optical modulation device 100 which is an optical functional device according to this embodiment includes the optical modulation element 102 which is an optical functional element, the package case 104 which accommodates the optical modulation element 102, the input optical fiber 106 which guides the input light to be input to the optical modulation element 102 into the package case 104, and the output optical fiber 108 which guides the output light including light output from the optical modulation element to the outside of the package case 104. Here, the input optical fiber 106 and the output optical fiber 108 are fixed to one surface 105 of the package case 104. Further, the optical modulation device 100 has the first reflecting surface 210 that reflects the input light output from the input optical fiber 106 in a direction toward the optical path of the output light, the second reflecting surface 212 that reflects the input light reflected by the first reflecting surface 210 to the optical modulation element 102, and the third reflecting surface 220 that reflects the output light from the optical modulation element 102 in a direction in which the output light becomes further away from the optical axis of the input optical fiber 106. In addition, in the optical modulation device 100, the optical axis 214 of the leaked light beam that is reflected by the first reflecting surface 210 and is then transmitted through the second reflecting surface 212 or the extension line of the optical axis 214 in the optical propagation medium through which the leaked light beam can be propagated does not include a portion which is aligned with the optical axis 216 of the output light reflected by the third reflecting surface 220.

According to this configuration, in the optical functional device in which both the input optical fiber 106 and the output optical fiber 108 are disposed on one surface of the package case 104, it is possible to keep the crosstalk between the input light from the input optical fiber 106 and the output light to the output optical fiber 108 low and to achieve good optical characteristics.

Further, in the optical modulation device 100-4, the shield 400 that shields the leaked light beam is provided at a position on the optical axis 414 of the leaked light beam which is reflected by the first reflecting surface 210-4 and is then transmitted through the second reflecting surface 212-4 and between the second reflecting surface 212-4 and the third reflecting surface 220. According to this configuration, it is possible to keep the crosstalk of the input light with respect to the output light low, without limiting the relative position among the first reflecting surface 210-4, the second reflecting surface 212-4, and the third reflecting surface 220, and to achieve good optical characteristics.

Furthermore, in the optical modulation device 100 (or 500-2), the optical axis 214 (or 614) of the leaked light beam which is reflected by the first reflecting surface 210 (or 610) and is then transmitted through the second reflecting surface 212 (or 612) or the extension line of the optical axis 214 (614) in the optical propagation medium is separated from the optical axis 216 (or 1016) of the output light reflected by the third reflecting surface 220 (620-2) by the distance d1 (or d4) that is greater than the value of the diameter of the leaked light beam.

In addition, in the optical modulation device 100-2 (or 500 or 500-1), the optical axis 314 (or 614) of the leaked light beam which is reflected by the first reflecting surface 210-2 (or 610) and is then transmitted through the second reflecting surface 212-2 (612) is not parallel to the optical axis 216 (or 616 or 816) of the output light reflected by the third reflecting surface 220 (or 620 or 620-1).

According to these configurations, it is possible to effectively separate the optical axis of the leaked light beam of the input light from the optical axis of the output light and thus to achieve good optical characteristics with small crosstalk.

Further, for example, in the optical modulation device 100, the third reflecting surface 220 may not be disposed on the extension line of the optical axis 214 of the leaked light beam, which is reflected by the first reflecting surface 210 and is then transmitted through the second reflecting surface 212, in the optical propagation medium. According to this configuration, it is possible to further reduce the crosstalk of the input light with respect to the output light and thus to achieve better optical characteristics.

Furthermore, the optical functional element whose example is the optical modulation element 102 in the above-described embodiments includes the optical waveguides formed on the substrate. The end portion of the input waveguide 202 that receives the input light and the end portions of the output waveguides 204a and 204b that output the output light are disposed on the optical input and output surface 128 which is one end surface of the substrate. According to this configuration, in the optical functional device in which optical components are densely disposed between one optical input and output surface 128 of the optical modulation element 102 and one surface 105 of the package case 104 in which the input optical fiber 106 and the output optical fiber 108 are provided, it is possible to reduce the crosstalk of the input light with respect to the output light and thus to achieve good optical characteristics.

What is claimed is:
1. An optical functional device comprising:
an optical functional element;
a package case that accommodates the optical functional element;
an input optical fiber that guides input light to be input to the optical functional element into the package case; and
an output optical fiber that guides output light comprising light output from the optical functional element to an outside of the package case,
wherein both the input optical fiber and the output optical fiber are fixed to one surface of the package case,
the optical functional device includes:
a first reflecting surface that reflects input light output from the input optical fiber in a direction toward an optical path of the output light;

a second reflecting surface that reflects the input light reflected by the first reflecting surface to the optical functional element; and a third reflecting surface that reflects the output light from the optical functional element in a direction in which the output light becomes further away from an optical axis of the input optical fiber, and an optical axis of a leaked light beam transmitted through the second reflecting surface after being reflected by the first reflecting surface or an extension line of the optical axis in an optical propagation medium through which the leaked light beam is capable of being propagated, does not include a portion that is aligned with an optical axis of the output light reflected by the third reflecting surface.

2. The optical functional device according to claim 1,
wherein a shield that shields the leaked light beam is provided at a position between the second reflecting surface and the third reflecting surface and on the optical axis of the leaked light beam transmitted through the second reflecting surface after being reflected by the first reflecting surface.

3. The optical functional device according to claim 1,
wherein the optical axis of the leaked light beam transmitted through the second reflecting surface after being reflected by the first reflecting surface or the extension line of the optical axis is separated from the optical axis of the output light reflected by the third reflecting surface by a distance that is greater than a value of a diameter of the leaked light beam.

4. The optical functional device according to claim 1,
wherein the optical axis of the leaked light beam transmitted through the second reflecting surface after being reflected by the first reflecting surface is not parallel to the optical axis of the output light reflected by the third reflecting surface.

5. The optical functional device according to claim 1,
wherein the third reflecting surface is not disposed on the extension line of the optical axis of the leaked light beam transmitted through the second reflecting surface after being reflected by the first reflecting surface.

6. The optical functional device according to claim 1,
wherein the optical functional element comprises optical waveguides formed on a substrate, and an end portion of an input waveguide that receives the input light and an end portion of an output waveguide that outputs the output light are disposed on the same end surface of the substrate.

* * * * *